(12) United States Patent
Spisak

(10) Patent No.: US 7,188,318 B2
(45) Date of Patent: Mar. 6, 2007

(54) WEB ACCESSIBILITY ASSISTANT

(75) Inventor: Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 10/166,839

(22) Filed: Jun. 11, 2002

(65) Prior Publication Data

US 2003/0234822 A1    Dec. 25, 2003

(51) Int. Cl.
*G06F 3/00* (2006.01)
(52) U.S. Cl. ............... 715/827; 345/172; 345/760
(58) Field of Classification Search ............... 345/168, 345/169, 172; 715/513, 760, 738, 765, 866, 715/827; 704/2
See application file for complete search history.

(56) References Cited

U.S. PATENT DOCUMENTS

| 6,029,135 | A | | 2/2000 | Krasle |
| 6,085,120 | A | | 7/2000 | Schwerdtfeger et al. |
| 6,122,391 | A | * | 9/2000 | Ringland et al. ........... 382/100 |
| 6,289,304 | B1 | | 9/2001 | Grefenstette |
| 2002/0036620 | A1 | * | 3/2002 | Tervo ......................... 345/172 |
| 2002/0070962 | A1 | * | 6/2002 | Van Doorselaer et al. .. 345/738 |
| 2002/0156870 | A1 | * | 10/2002 | Boroumand et al. ........ 709/219 |

* cited by examiner

*Primary Examiner*—Kieu D. Vu
(74) *Attorney, Agent, or Firm*—Schmeiser, Olsen & Watts; William E. Schiesser

(57) ABSTRACT

A utility computer program to make the web accessible to users who cannot use a mouse filters a web page and adds code to trigger all URLs in the page with a 2-character key code, display the code on the screen, add and display key codes to images that are links, and cause all URLs to call the program when exercised, so that the next web page accessed is also filtered.

20 Claims, 4 Drawing Sheets

WEB ACCESSIBILITY ASSISTANT

TECHNICAL FIELD

The field of the invention is that of computer programs for assisting disabled persons to use the Internet, in particular the World Wide Web.

BACKGROUND OF THE INVENTION

Recommendations for standard methods for accessing the Internet have been made by various bodies such as World Wide Web Consortium (W3C), W3C-Web Accessibility Initiative (WAI), IBM Corporation Microsoft Corporation, National Institute for Disability and Rehabilitation Research and Verizon Foundation, including methods appropriate for use by persons with various handicaps.

In particular, advocates for the disabled recommend that standard client/server applications should be accessible/ "navigatable" by multiple methods. Moreover, this would be beneficial to diverse companies who wish to expand their existing user/customer base to allow end-users to navigate using either a mouse or the keyboard.

Not all web sites are aware of such standards, let alone being compliant with them and there are many web sites that people who cannot use a mouse cannot access.

It would be advantageous if a program were available to modify non-compliant web sites so that they may be accessed using only the keyboard.

SUMMARY OF THE INVENTION

The invention relates to a computer program that modifies a web page and converts the URL links to a handicap-accessible format.

A feature of the invention is the filtering of a web page and conversion of all URL links into navigation elements that may be navigated via either a mouse or a keyboard.

Another feature of the invention is the addition of "ALT" parameters to images that are links to web sites so that alternative text information for graphical images referenced by the "IMG" tag helps the visitor understand what is on the page even if they are using a text browser or if they have image loading turned off in their graphical browser.

DETAILED DESCRIPTION

Figure 1:
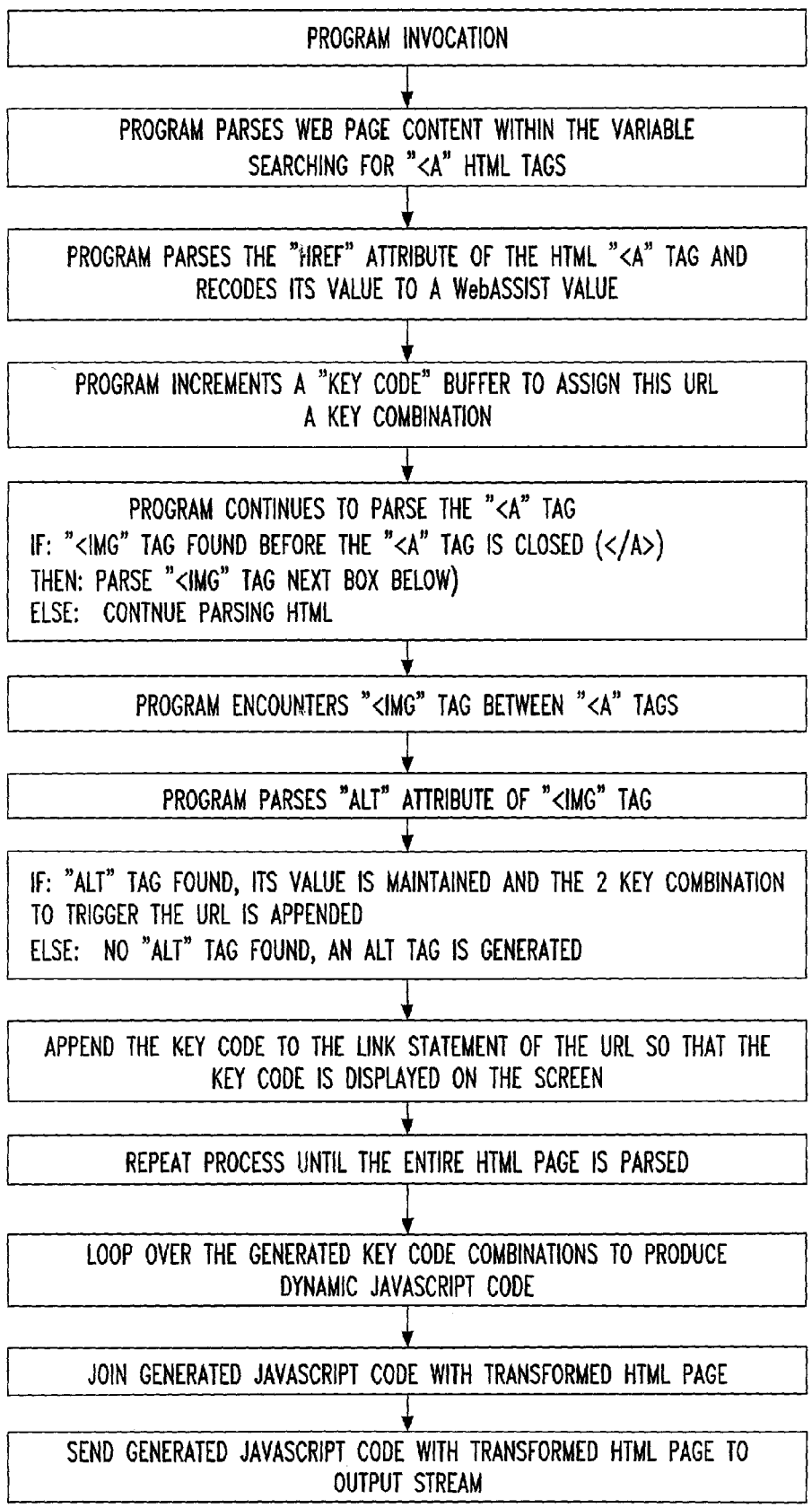
FIG. 1 illustrates a flow chart for a program according to the invention.

In the course of viewing sites on the Internet, users routinely place the mouse cursor on an icon, photograph or other location on the computer display and click the mouse button. Although word processing programs permit the user to use "shortcuts" employing keys on the keyboard, Internet browsers do not have this capability.

Keyboard navigation capability is provided by a program, resident in memory, that can be invoked to process the screen image presented by an Internet site and to generate key combinations that will cause the computer to perform the same functions as mouse clicks.

Those skilled in the art are aware that a web site passes (through the browser) to the user's computer a collection of parameters that specify the image displayed on the screen. Among the items displayed are icons that invoke other pages in that web site or other web sites. When the user clicks his mouse (the phrase "mouse click" also refers to equivalent switch data such as input from a trackball or from a joystick on a laptop) on the icon, the browser fetches data from the URL associated with the icon. The URL itself, being a string of numbers, is not displayed to the user. The icon may be text—(e.g. www.somesite.com) or a graphic symbol. For convenience in expressing the claims, the term "URL" will be taken to mean any representation of the data used by the Web, including text and graphics. When the web page is displayed on the computer screen, a representation of the screen is stored in computer memory. The representation may be in an expanded form specifying the color for each pixel or it may be in the condensed form of the HTML (or other language). When the system has moved on to another screen, previously displayed screens are often cached, so that they may be called up quickly. The cache may be in RAM or in slower storage, such as a disk.

A program according to the invention may operate in at least the following modes:
1. A web-based GUI interface (basically a web page), that the user would invoke (e.g. FIG. 3). Once at the web page, the user is provided with a text-box to type a URL (Universal Resource Locator) into. The URL that is typed into the text-box on the web page is fetched and "transcoded" on the fly by the inventive program to enable triggering URL's by keystroke. Each subsequent page fetched from then on is transcoded to enable keystrokes. The display of the data is performed by the browser.
2. A plug-in to the browser client application; i.e. the application could run locally to the web browser. Once activated, the program would enable the displayed web page to have the appropriate keystroke mechanism for each URL displayed. Each subsequent page fetched from then on is transcoded to enable keystrokes (FIG. 2).
3. A Proxy Server implementation that intercepts the data stream coming from the Internet to the browser and transcodes (analogous to translating) the data on the fly.
4. A developer interface implementation that would enable the author of a web page to include special symbols in the actual HTML code (e.g.: @HOTKEY="A"). When a web browser requests the web page, a processor on the web server scans the requested web page and finds the special symbols in the HTML code (e.g.: @HOTKEY="A") and converts these to the appropriate keystroke mechanism for each URL displayed. Every web page called that contains the special symbol in the HTML code would be enabled for "transcoding".

In operation, the program parses the data for a web page. A detailed description of the steps involved is shown in TABLE 1, with a simplified version in FIG. 1. When the program encounters a URL, it generates computer code (preferably in the JavaScript language) that inserts a two-key code in the screen display near the icon that represents the URL. When the screen is displayed and the computer is waiting for a response, the program scans the keyboard data stream for any of the codes that it has displayed. It intercepts a code from the user and passes the appropriate mouse clicks to the browser (along with the data that is ordinarily sent to the browser, e.g. the actual URL associated with the icon).

TABLE 1

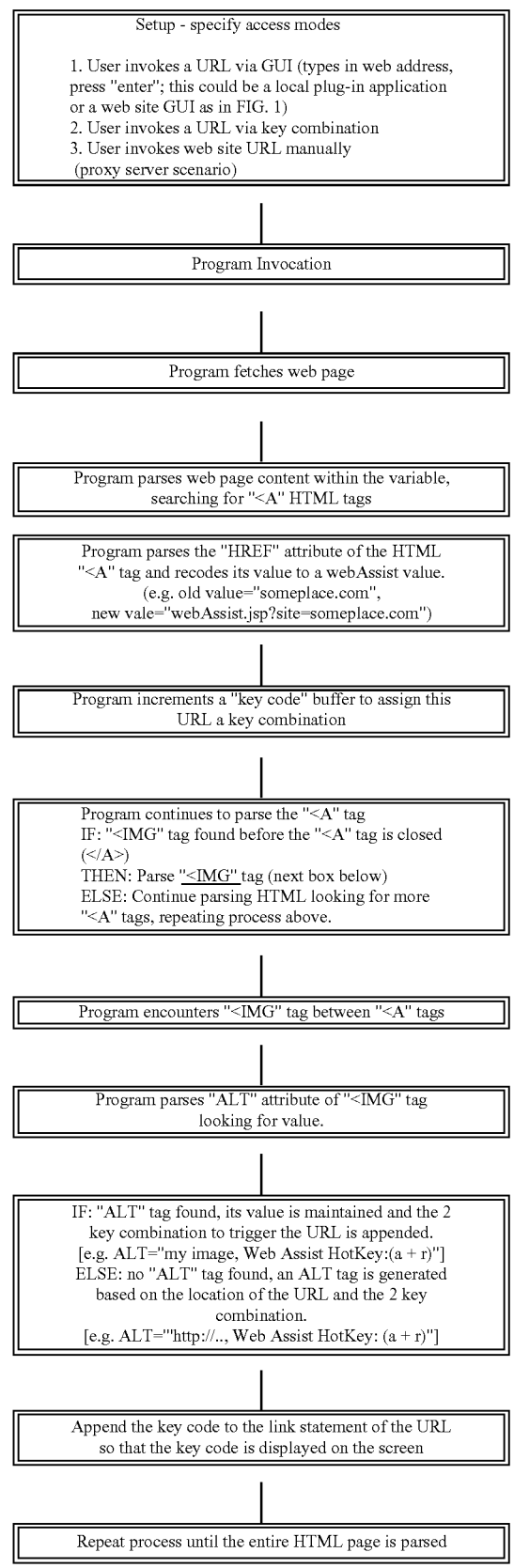

TABLE 1-continued

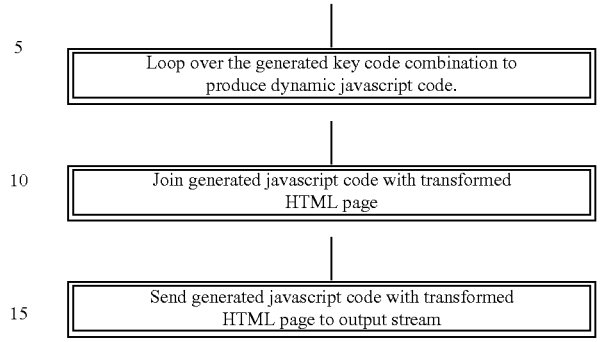

The browser fetches the information that the user has specified with the key code, e.g. another web page, and the program parses that in the same way. The procedure continues through the Internet session, so that, once the program has been invoked, the user sees keycodes on each screen containing a URL without further action on his part.

The JavaScript code is placed in the header of the HTML document, so that it is stored along with the other document data when the page is cached in computer memory. Thus, when the user performs an act equivalent to clicking on the "back" arrow on the screen (e.g. typing the 2-key code for the back arrow) the stored page is fetched from memory with the key codes already placed in the data.

Those skilled in the art are familiar with the standard format that presents a URL to the user, such as—"www-.somesite.com" and also with the convention that the mouse pointer arrow changes to a hand with a pointing finger when the mouse cursor passes over a photograph or other icon that does not show text. Optionally, the parsing action of the program includes testing images for links to URLs. If a link is found, the program converts an ALT parameter associated with the image to generate a key code in the same way as with other links. If an ALT parameter is not found, the program adds one, together with the keycode.

The keycodes are preferably chosen so that they contain a symbol such as # that does not occur in ordinary text and so will not cause confusion with text that the user may type in the course of using the web page (such as a search request). Optionally, the user may type the key-combination that "wakes" the listener the keyboard assistant then traps keystrokes and tries to associate it with a URL link on the displayed page. The keyboard assistance turns itself off when one of the following conditions are met: 1after a link is successfully triggered, 2after the key combination toggles the listener off.

The keycodes can be anything a programmer wants (illustratively beginning with a symbol such as '#' or the key combination) or any character combination. A programmer using the invention may choose to display the keycode next to each link on the page or in a separate box that lists keycodes together with the URLs that they substitute for, depending on a design choice. As another design choice, the programmer may choose to include code to enable the user to navigate through the screen display using the keyboard: (screen top, screen bottom, tab to go to the next URL, etc.).

Figure 2:
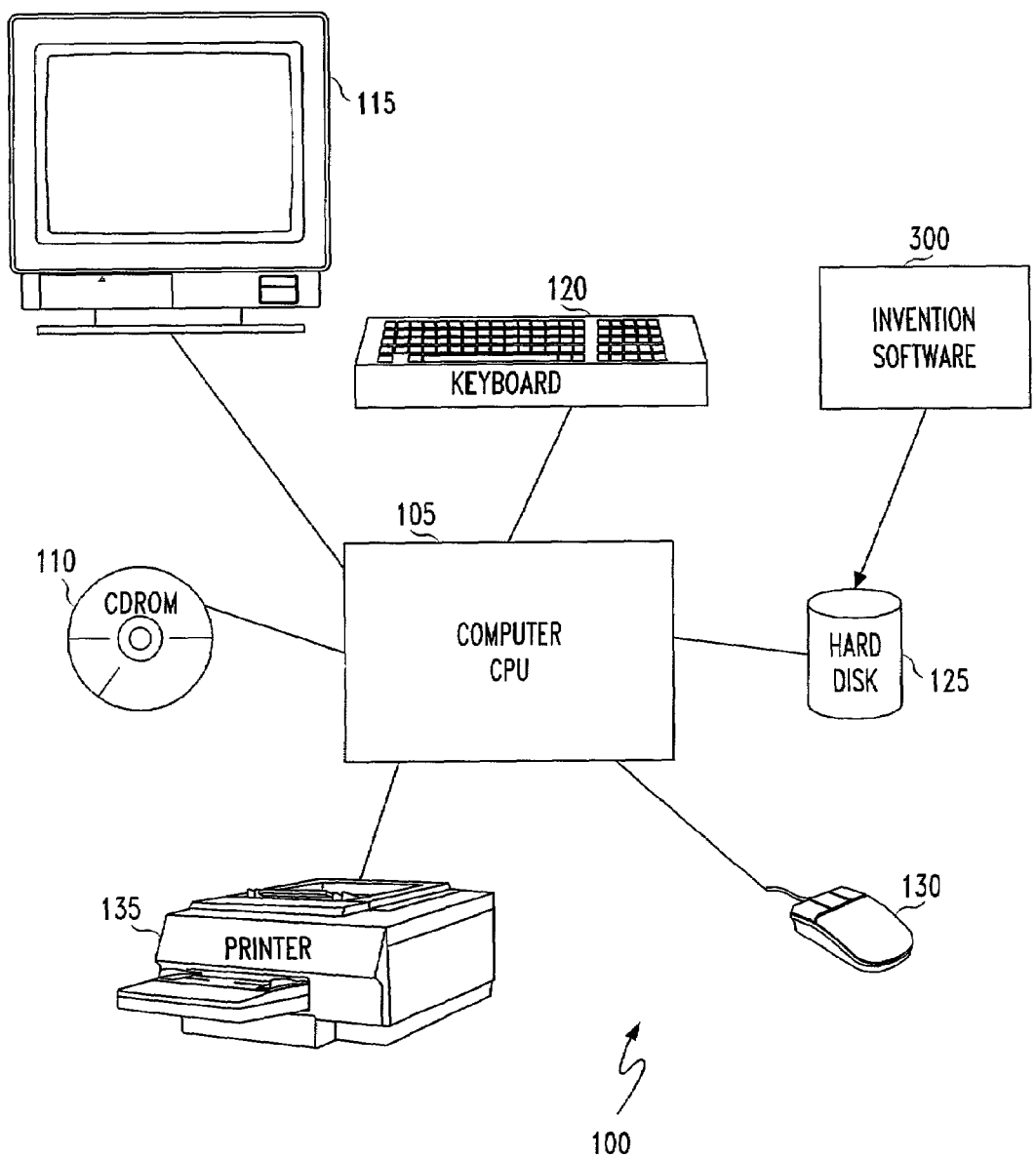
FIG. 2 represents schematically a computer system for use with the invention.
Figure 3:
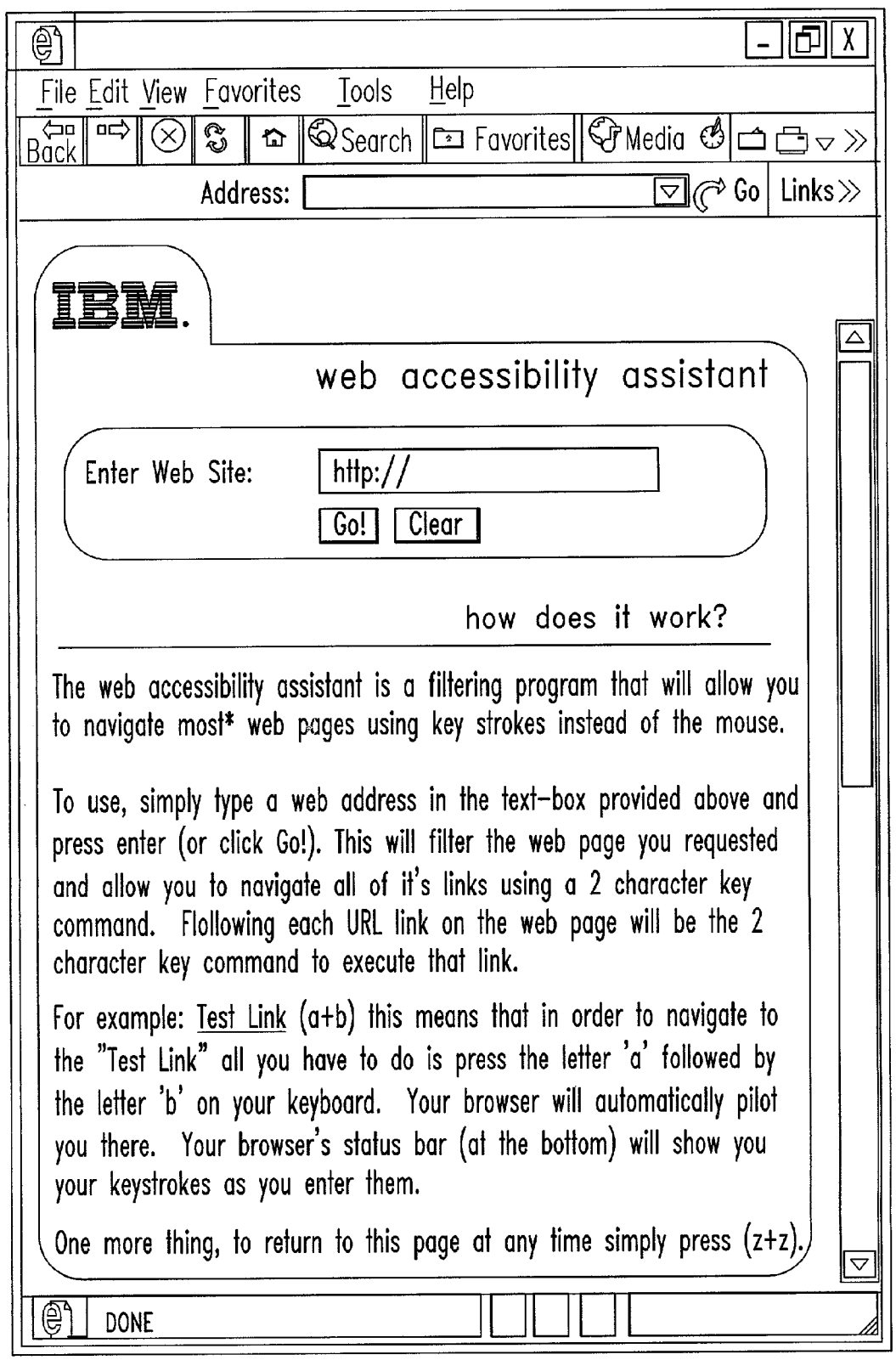
FIG. 3 illustrates an introductory screen displayed by a program according to the invention.
Figure 4:
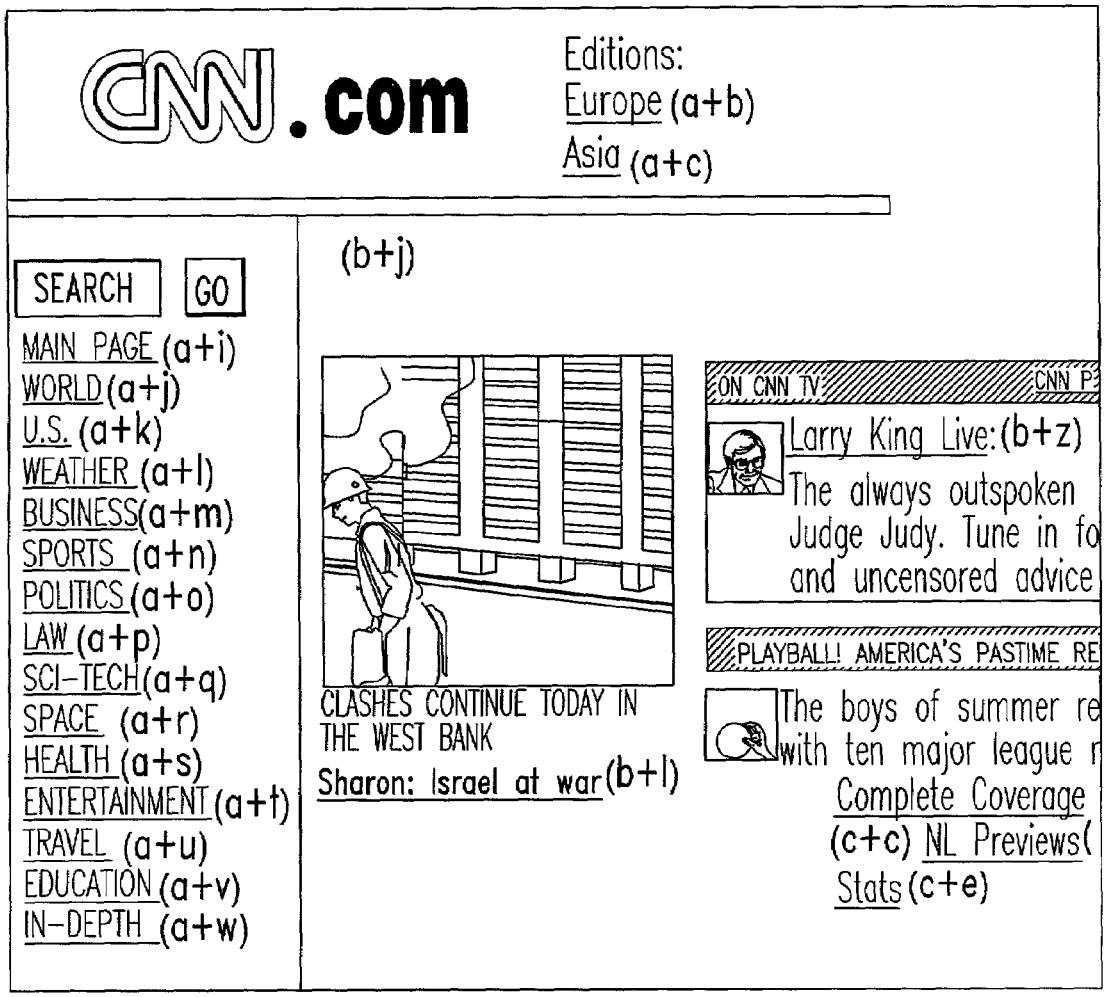
FIG. 4 illustrates a Web page modified by a program according to the invention.

Referring now to FIG. 2, there is shown in schematic form a typical computer system 100 in which CPU 105 performs the processing, CRT 115 is the screen display, mouse 130 provides the mouse clicks that are substituted for, keyboard 120 is used for the keystroke combinations, CDRQM 110 may be used for transferring programs, disk 125 and software box 300 store the programs and data and printer 135 and standard output and input functions.

While the invention has been described in terms of a single preferred embodiment, those skilled in the art will recognize that the invention can be practiced in various versions within the spirit and scope of the following claims.

What is claimed is:

1. An article of manufacture in computer readable form comprising means for performing a method for operating, in a computer system having a keyboard and a display screen, a program that accepts mouse clicks by substituting keyboard entries for mouse clicks, said method comprising the steps of:
    associating a keystroke combination with at least one Universal Resource Locator (URL);
    responsive to the keystroke combination, passing a mouse click and other data to the program, said other dater comprising the URL;
    processing a data stream containing at least one URL;
    transcoding URLs in said data stream to associate a keystroke combination with each of said URLs: and
    displaying a screen display based on said data stream and including said keystroke combinations together with representations of said URLs.

2. The article of manufacture of claim 1, said method further including the steps of responding to a computer program in said computer system as a proxy server and processing requests from said computer program for data from data processing systems external to said computer system, whereby said data stream containing at least one URL is received from at least one data processing system external to said computer system.

3. The article of manufacture of claim 1, in which said article of manufacture is in the form of a plug-in program associated with a web browser program in which:
    said step of transcoding URLs is performed on a web page fetched by said browser; and
    further including the steps of storing representations of said keystroke combinations with said URLs, whereby said keystroke combinations are displayed together with representations of said URLs.

4. The article of manufacture of claim 1,
    wherein the at least one URL comprises a plurality of URLs;
    wherein said processing the data stream comprises fetching a first web page from the data stream and parsing the fetched first web page, said first web page comprising one or more URLs of the plurality of URLs;
    wherein said transcoding comprises: as each URL of the one or more URLs on the first web page is encountered during said parsing of the first web page, generating and executing computer code that associates a keystroke combination consisting of a two-key code with said each URI, on the first web page; and
    wherein said displaying comprises displaying the first web page on the display screen and depicting on file displayed first web page: each two-key code and an indication of which URL on the first web page each two key-code is associated with.

5. The article of manufacture of claim 4, wherein said depicting comprises depicting each two-key code near an icon that represents the URL that each two-key code is associated with.

6. The article of manufacture of claim 4, wherein said depicting comprises depicting on the first web page a box that lists each two-key code and the URL that each two-key code is associated with.

7. The article of manufacture of claim 4, said method further comprising:
    after said displaying the first web page, scanning a keyboard data stream for detection of a first two-key code of the displayed two-key codes on the first web page, the URL on the first web page associated with the first two-key code having a link to a second web page, said keyboard data stream having been generating from use of the keyboard by a user of the computer system following said displaying.

8. The article manufacture of claim 7,
    wherein said processing the data stream comprises in response to detection of the first key-code during said scanning the keyboard data stream: fetching a second web page and parsing the fetched second web page, said second web page comprising one or more URLs of the plurality of URLs;
    wherein said transcoding comprises: as each URL of the one or more URLs on the second web page is encountered during said parsing of the second web page: generating and executing computer code that associates a two-key code with said each URL on the second web page; and
    wherein said displaying comprises displaying the second web page on the display screen and depicting on the displayed second web page: each two-key code and an indication of which URL on the second web page each two-key code is associated with.

9. The manufacture of claim 8, said method further comprising after said displaying the second web page:
    depicting a back arrow two-key code from the keyboard data stream; and
    responsive to said detecting the back arrow two-key code: redisplaying the first web page on the display screen in a same manner that the first web page had been previously displayed.

10. The article of manufacture of claim 4, wherein the generated computer code is in a JavaScript language.

11. A method for operating, in a computer system having a keyboard and a
    display screen, a program that accepts mouse clicks by substituting keyboard entries for mouse clicks, said method comprising the steps of:
    associating a keystroke combination with at least one Universal Resource Locator (URL);
    responsive to the keystroke, passing a mouse click and other data to the program, said other data comprising the URL;
    processing a data stream containing at least one URL;
    transcoding URLs in said data stream to associate a keystroke combination with each of said URLs; and
    displaying a screen display based on said data stream and including said keystroke combinations together with representations of said URLs.

12. The method of claim 11, said method further including the steps of:
    responding to a computer program in said computer system as a proxy server and processing requests from said computer program for data from data processing systems external to said computer system.

13. The method of claim 11, said method further including the steps of:

automatically transcoding URLs in a web page fetched by said browser to associate a keystroke combination with each of said URLs; and storing representations of said keystroke combinations with said URLs, whereby said keystroke combinations are displayed together with representations of said URLs.

14. The method of claim 11, wherein the at least one URL comprises a plurality of URLs;

wherein said processing the data stream comprises fetching a first web page from the data stream and parsing the fetched first web page, said first web page comprising one or more URLs of the plurality of URLs;

wherein said transcoding comprises: as each URL of the one or more URLs on the first web page is encountered during said parsing of the first web page, generating and executing computer code that associates a keystroke combination consisting of a two-key code with said each URL, on the first web page; and wherein said displaying comprises displaying the first web page on the display screen and depicting on file displayed first web page: each two-key code and and an indication of which URL on the first web page each two key-code is associated with.

15. The method of claim 14, wherein said depicting comprises depicting each two-key code near an icon that represents the URL that each two-key code is associated with.

16. The method of claim 14, wherein said depicting comprises depicting on the first web page a box that lists each two-key code and the URL that each two-key code is associated with.

17. The method of claim 14, said method further comprising:

after said displaying the first web page, scanning a keyboard data stream for detection of a first two-key code of the displayed two-key codes on the first web page, the URL on the first web page associated with the first two-key code having a link to a second web page, said keyboard data stream having been generating from use of the keyboard by a user of the computer system following said displaying.

18. The method of claim 17, wherein said processing the data stream comprises in response to detection of the first key-code during said scanning the keyboard data stream: fetching a second web page and parsing the fetched second web page, said second web page comprising one or more URLs of the plurality of URLs;

wherein said transcoding comprises: as each URL of the one or more URLs on the second web page is encountered during said parsing of the second web page: generating and executing computer code that associates a two-key code with said each URL on the second web page; and wherein said displaying comprises displaying the second web page on the display screen and depicting on the displayed second web page: each two-key code and an indication of which URL on the second web page each two-key code is associated with.

19. The method of claim 18, said method further comprising after said displaying the second web page:

depicting a back arrow two-key code from the keyboard data stream; and responsive to said detecting the back arrow two-key code: redisplaying the first web page on the display screen in a same manner that the first web page had been previously displayed.

20. The method of claim 14, wherein the generated computer code is in a JavaScript language.

\* \* \* \* \*